July 9, 1940.　　　P. KLOTSCH　　　2,206,901
MOTOR VEHICLE
Filed Jan. 18, 1937　　　2 Sheets-Sheet 1

Inventor
Paul Klotsch.
By Dike, Calver & Gray
Attorneys.

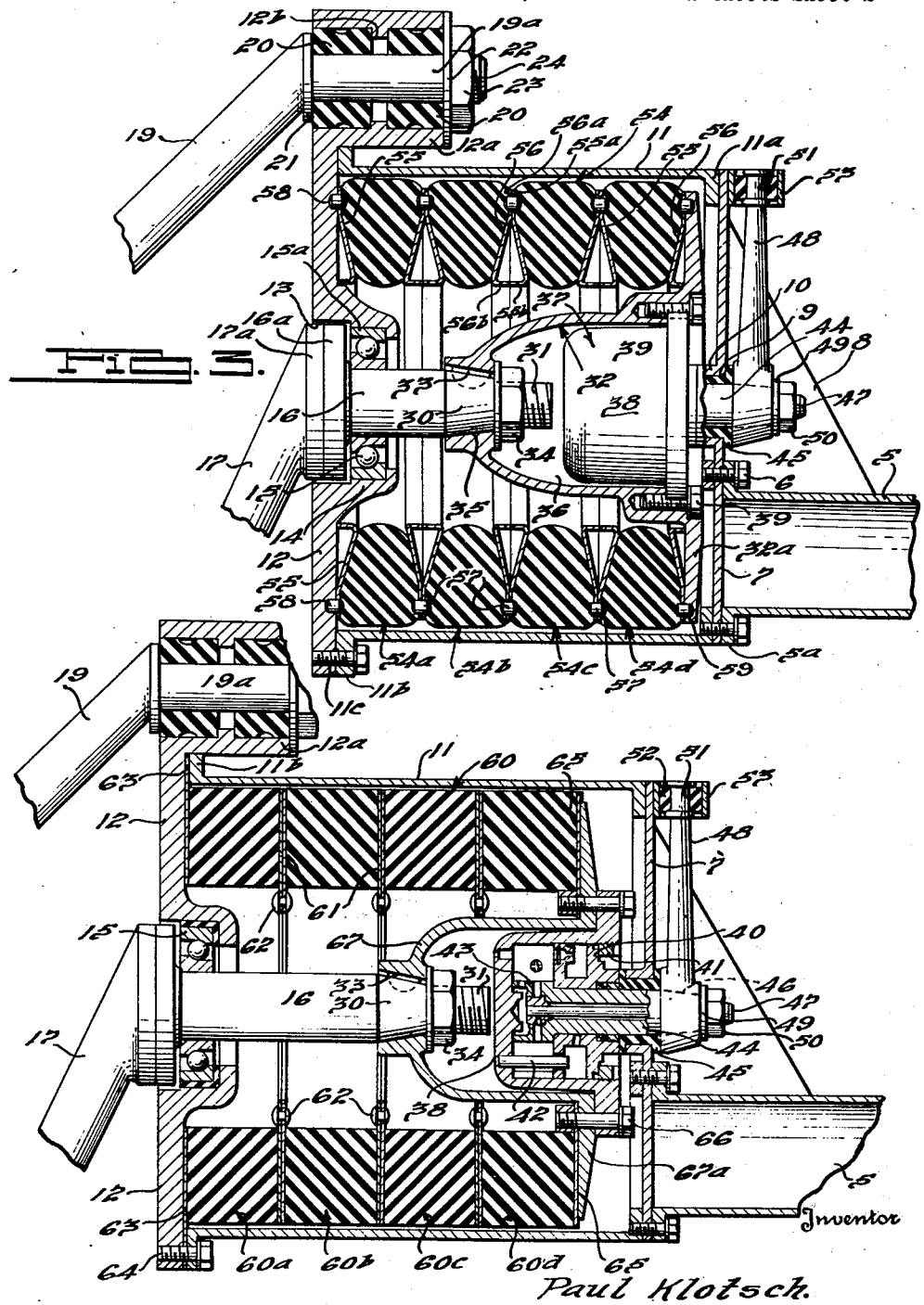

Patented July 9, 1940

2,206,901

UNITED STATES PATENT OFFICE 2,206,901

MOTOR VEHICLE

Paul Klotsch, Detroit, Mich., assignor to Briggs Manufacturing Company, Detroit, Mich., a corporation of Michigan Application January 18, 1937, Serial No. 121,085

13 Claims. (Cl. 267—21)

This invention relates to motor vehicles and more particularly to wheel suspensions therefor.

One of the objects of the present invention is to provide an improved wheel suspension for a motor vehicle, in which the resiliency of wheel suspension is effected by the provision of torsion members made of resilient material such as rubber, which members are adapted to resist the upward movement of the wheels.

Another object of the invention is to provide novel and improved means for resiliently mounting the front or rear wheels of a motor vehicle, which means are adapted to spring each wheel separately, are very compact, and permit considerable lowering of the vehicle between the front wheels.

Still another object of the invention is to provide improved means for substantially complete absorption of shocks of different frequencies and amplitudes and to prevent transmission of said shocks to the body of the vehicle.

A further object of the invention is to provide an improved wheel suspension for a motor vehicle in which there is no continuous metal to metal path from the wheels to the body of the vehicle.

It is an added object of the present invention to provide an improved wheel suspension of the foregoing character which is simple in construction and is relatively cheap to manufacture and repair.

Other objects of this invention will appear in the following description and appended claims, reference being had to the accompanying drawings forming a part of this specification wherein like reference characters designate corresponding parts in the several views.

Fig. 3 is a sectional view showing the arrangement and the details of construction of the torsion members.

Fig. 4 is a view similar in part to Fig. 3, showing a modified construction of the torsion members.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 1:
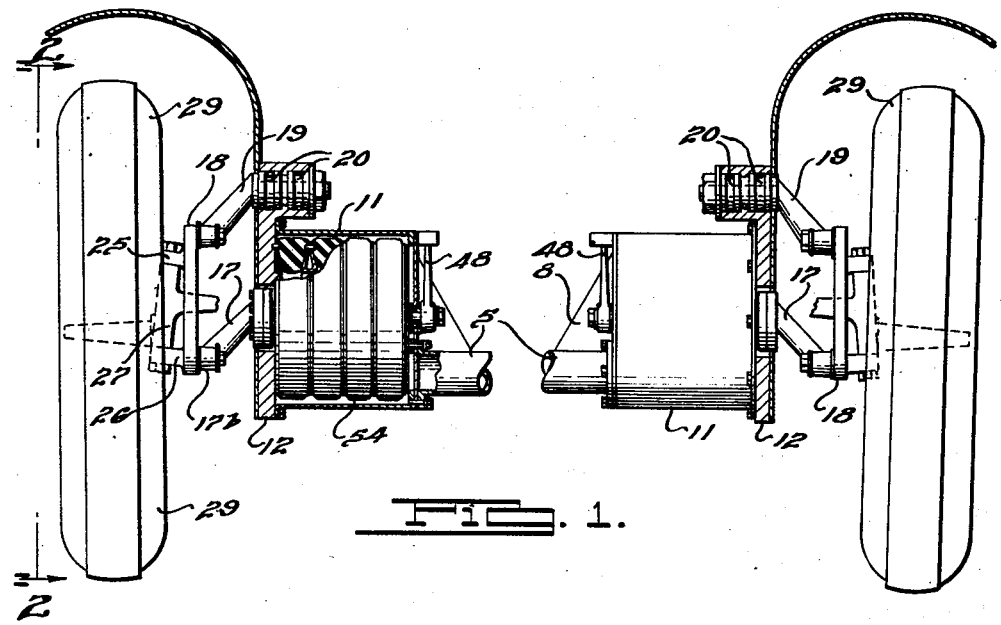
Fig. 1 is a fragmentary front view of a vehicle partly in section, showing one embodiment of the invention.
Figure 2:
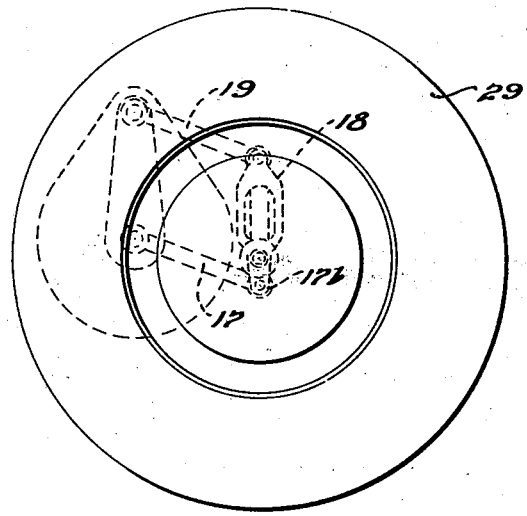
Fig. 2 is a side view taken on the line 2—2 of Fig. 1 in the direction of the arrows.

In the drawings there is shown, by way of example, a part of a motor vehicle provided with front wheel suspension embodying the present invention. Referring to Fig. 1, the illustrated structure includes a rigid tubular member 5 extending transversely of the vehicle and secured to the body structure thereof. The extremities of said tube member 5 are provided with flanges 5a to which is secured by a plurality of screws 6 a back plate 7. An angle bracket 8 secured in any convenient manner to both the tube 5 and the plate 7 adds to the rigidity of connection. The plate 7 is of a circular form and at its center it is provided with an opening 9 at the edges of which there is formed a cylindrical outwardly extending flange 10. The peripheral edges of said plate 7 are adapted to bear against a continuous circular flange 11a of a drum 11 extending outwardly, its center line lying substantially in the same plane with the center line of the tube 5. The outer end of the drum 11 is provided with an annular, outwardly extending flange 11b which is adapted to bear against a cover plate 12 to which it is detachably secured in any convenient manner, such as by screws 11c.

It should be noted at this point that the construction of the wheel suspension is similar at each of the front wheels, and therefore, only one of them need be described in detail. The following description refers to the left hand side wheel (as it appears in the drawings), it being understood that the structure effecting suspension of the right hand wheel is similar and that equivalent suspension means may, as desired, be provided for the rear wheels of the vehicle.

The plate 12 is provided with a central aperture 13 surrounded by an inwardly extending boss or projection 14 providing means for mounting a thrust-resisting ball bearing 15. The outer ring 15a of said ball bearing is pressed into the aperture in said projection 14, while into its inner ring 15b is pressed a stub shaft 16 provided on its outward extremity with an annular flange 16a entering the aperture 13. To said flange 16a is bolted or otherwise secured the flange 17a of a swinging wheel carrying arm 17, the opposite end 17b whereof is hingedly connected to a steering head 18. The upper end of said steering head 18 is hingedly connected to the guiding arm 19 which is anchored by its end 19a to the plate 12, rubber bushings 20 being provided in the cylindrical nest 12a formed integrally on said plate 12. When assembled, one of said rubber bushings 20 is compressed between the shoulder 21 provided on the guiding arm 10 and the annular rib or bead 12b provided in said nest 12a, while the other of said bushings is pressed toward said bead 12b by a metal washer 22 held in place by an adjusting nut 23 engaging the threaded portion of the arm end 19a. By the above described means a resilient connection of the guiding arm 19 to the cover plate 12 is effected, the continuous metal path being interrupted by said rubber bushings 20.

The steering head 18 is provided with lugs 25 and 26 which are adapted, in the manner well known in the art, to carry a steering knuckle 27, which knuckle in turn carries a wheel 29 and is connected by means of suitable steering linkage (not shown) to the steering column of the vehicle.

The inwardly directed end of the shaft 16 is provided with a taper as indicated at 30 and the reduced end of the shaft is provided with an external thread as shown at 31 for supporting engagement of a spider member, generally indicated by the numeral 32. The spider is mounted for endwise adjustment on the shaft 16 through the medium of a key 33 and a nut 34, the tapered portion 30 of said shaft entering a tapering bore 35 provided in said spider member 32.

The spider member 32 has inwardly flaring arms which provide a space 36 adapted to receive a suitable shock absorber. A shock absorber of any suitable type may be employed in the assembly. However, I prefer to use a shock absorber commercially known as the Houdaille shock absorber, the same being shown in the drawings and indicated generally by the numeral 37. The outer casing 38 of the shock absorber is rigidly connected to the spider member or housing 32 by means of a plurality of bolts 39. By virtue of said arrangement the casing 38 is adapted to rotate or oscillate with said member 32. The details of construction of the shock absorber element per se form no part of the present invention and, therefore, a detailed description thereof is not necessary and only such structural features of said shock absorber are explained below as are believed material to the operation of my improved spring suspension. As seen in Fig. 4 the casing 38 of the shock absorber is divided into two portions by a stationary wing 40 held in position by a retainer ring 41 and rotatably connected with said casing by means of a plurality of pins 42. An oscillating piston 43 provided with suitable ball check valves is carried by a piston shaft 44 which passes through the opening 9 of the back plate 7, a resilient flanged bushing 45 being provided in said opening between said shaft 44 and the flange 10. The shaft 44 protrudes through said plate 7 and extends inwardly of the vehicle, said protruding portion being tapered as indicated at 46, and its end being externally threaded as shown at 47. On said protruding portion there is mounted a radially extending arm 48 the inner end of which is provided with a tapering hole for engaging said tapering portion 46 of the shaft 44. A washer 49 and a nut 50 engaging said threaded end 47 press the arm 48 unto said tapered portion of the shaft and the flange 45a of the rubber bushing 45. The outer end of the arm 48 is recessed at 51, said recessed portion being engaged by a rubber bushing 52 held by a bracket 53 secured to the plate 7. By virtue of the above construction the outer end of said arm 48 is resiliently anchored to the plate 7 and, consequently, to the vehicle body structure.

It will now be appreciated in view of the foregoing that vertical movements of the wheel 29 cause reversible rotations of the shaft 16, spider member 32, and the casing 38 of the shock absorber 37. Violent shocks of large amplitudes and low frequencies bring into operation the shock absorber 37, which yieldably resists violent torsional distortions of the specially provided resilient members (hereinafter described in detail) and checks too rapid return of said members into their unstrained condition.

Means are provided for resiliently resisting such rotation of the spider member 32 and, consequently, the vertical movements of the wheel 29, thereby effecting resiliency of suspension of the wheel. In the present embodiment said means are exemplified by a torsion resisting assembly 54. Referring to Fig. 3, said assembly 54 comprises a plurality, in the present instance four, of similar annular resilient members 54a, 54b, 54c and 54d, said members being ring-shaped and arranged coaxially with respect to the shaft 16 and to the spider member 32. Each of these members is bonded, vulcanized or equivalently secured at opposite faces to a pair of metal disks 55 and 56. The resilient members of the assembly are made of a highly elastic material, preferably rubber. For the purpose of eliminating high localized stresses, said members are made of varying cross section converging to their respective centers, thereby effecting proper distribution of resilient material for substantially uniform straining thereof. The metal disks 55 and 56 are formed, preferably by stamping, to correspond to the converging shape of the resilient members, their outer portions 55a and 56a adapted to bear flatly against each other, while their inner portions are bent as shown to provide abutting edges 55b and 56b. The disks 55 and 56 are drivingly connected to each other by means of coupling pins 57 which are lodged within registering holes punched in their respective portions 55a and 56a.

The spider member 32 is provided with a flange or flanges 32a, and the disk 56 of the inner resilient member 54d is drivingly connected to said flange by means of a plurality of pins 59 lodged within respective holes punched in said disk 56 and the registering holes drilled in said flange 32a. The disk 55 of the outer resilient member 54a is anchored to the front plate 12 by means of pins 58 lodged in the holes punched in said disk and in the registering holes drilled in said plate 12.

With the above description in view, it can be seen from an examination of the drawings that as the wheel 29 moves up, the swinging arm 17 is turned and the shaft 16 and the spider member 32 are rotated through a certain angle. By means of the flange 32a, pins 59 and the adjacent metal disk 56, said rotation is transmitted to the adjacent rubber torsion member 54d, which, in turn, transmits the rotation to the next adjoining member 54c and thence it is transmitted to the members 54b and 54a. Since the member 54a is positively secured through its metal disk 55 to the fixed plate 12 and is restrained from rotation, each of said resilient members is torsionally restrained, and therefore, a certain torsional effort is necessary to overcome the resilient torsional resistance of said members. Therefore, vertical movements of said wheel 29 are resiliently resisted, the amount of said resistance being dependent upon the size, material, number and arrangement of said members 54.

The function of the shock absorber is to cushion the torsional distortion of the members of the assembly 54 and to check the rebound thereof, which is effected by proper passing of the fluid in the shock absorber through the restricted openings controlled by means of suitable ball check valves. It is to be understood that the shock absorber is principally designed to absorb the more violent shocks and in practice is ordinarily too "stiff" to absorb high frequency and small amplitude vibrations to which the wheel 29 may be subjected when travelling at high speeds. Such vibrations are transmitted by the member 32 to the torsion assembly 54 and are substantially completely absorbed thereby.

Fig. 4 shows a modified structure embodying a torsion assembly 60 of somewhat different construction. Referring to Fig. 4, the torsion assembly 60 comprises a plurality, in the present instance four, of annular rubber members 60a, 60b, 60c and 60d, which are of rectangular cross section. To both sides of said rubber members are bonded, vulcanized or otherwise secured flat metal disks 61, 63 and 65. The intermediate disks 61 are connected to each other by means of rivets 62. The outer disk 63 is anchored to the front plate 12 by means of screws 64 which hold the drum 11 to the plate 12. The inner disk 65 is drivingly connected by means of screws 66 to the flange 67a of the spider member 67, the latter corresponding substantially to the spider member 32 of the structure shown in Fig. 3.

In assembling the spring suspension device of each embodiment herein illustrated it will be understood that the nut 34 is turned up on the threaded end 31 of the shaft so as to compress the ring-like rubber blocks between the flanged ends 32a or 67a of the spider and the opposite end plate 12 of the drum or casing. The rubber members are preferably held under substantial compression in a direction axially of the drum. When the shaft 16 and the spider are rotated relatively to the stationary drum the rubber bonded between the metal faces of the disks of the unit 54 or 60 becomes distorted by shearing forces, the load being transmitted uniformly through the unit and absorbed by the rubber in angular shear. By maintaining the rubber under relatively high compression, strain on the bond between the surfaces of the rubber and metal rings is materially relieved and danger of destroying the bond and separating the parts is eliminated.

I claim:

1. In a wheel suspension, a stationary drum, an oscillatable wheel carrying arm journalled in said drum and including a rotatable member extending axially through the drum, a shock absorber extending into said drum and including relatively movable elements secured one to said member and one to said drum, and a resilient torsion unit mounted within the drum and embracing said member, said unit being connected at one end to said rotatable member and at its opposite end to said drum.

2. In a wheel suspension, a stationary drum, an oscillatable wheel carrying arm journalled in said drum and including a rotatable member extending axially through the drum, a shock absorber extending into said drum and including relatively movable elements secured one to said member and one to said drum, and a resilient torsion unit mounted within the drum and embracing said member and shock absorber, said unit being connected at one end to said rotatable member and at its opposite end to said drum.

3. In a wheel suspension, a stationary drum, an oscillatable wheel carrying arm journalled in said drum and including a rotatable member extending axially through the drum, a shock absorber extending into said drum and including relatively movable elements secured one to said member and one to said drum, and a resilient rubber torsion unit mounted within the drum and embracing said member, said unit being placed in compression and connected at one end to said rotatable member and at its opposite end to said drum.

4. In a wheel suspension, a stationary support, an oscillatable wheel carrying arm rotatable relatively to the support, a shock absorber secured to the arm, and a rubber torsion unit embracing said shock absorber and connected to said support and arm to resist relative rotation thereof by the deflection of the rubber in shear.

5. In a wheel suspension, a stationary support, an oscillatable wheel carrying arm rotatable relatively to the support, a shock absorber secured to the arm, a rubber torsion unit embracing said shock absorber and connected to said support and arm to resist relative rotation thereof by the deflection of the rubber in shear, and means for maintaining said unit under compression.

6. In a wheel suspension, a stationary support, an oscillatable wheel carrying arm rotatable relatively to the support, a shock absorber secured to the arm, and a rubber torsion unit embracing said shock absorber and connected to said support and arm to resist relative rotation thereof by the deflection of the rubber in shear, said unit comprising a plurality of ring-like rubber blocks and interconnected metal disks bonded thereto.

7. In a wheel suspension, a stationary support, an oscillatable wheel carrying arm rotatable relatively to the support, a shock absorber secured to the arm, a rubber torsion unit embracing said shock absorber and connected to said support and arm to resist relative rotation thereof by the deflection of the rubber in shear, and means for maintaining said unit under compression, said unit comprising a plurality of ring-like rubber blocks and interconnected metal disks bonded thereto.

8. In a wheel suspension, a stationary supporting drum, a spring device comprising a plurality of interconnected metal disks and ring-like rubber blocks bonded between the faces of the disks, a wheel carrying arm rotatable relative to said drum and having a rotatable member projecting axially thereinto, a shock absorber housed at least in part within said spring device and connected to said member, and means for connecting said spring device to the drum and said arm.

9. In a wheel suspension, a stationary supporting drum, a spring device comprising a plurality of interconnected metal disks and ring-like rubber blocks bonded between the faces of the disks, a wheel carrying arm rotatable relative to said drum and having a rotatable member projecting axially thereinto, a shock absorber housed at least in part within said spring device and connected to said member, and means for connecting said spring device to the drum and said arm, each of said rubber blocks converging in cross section toward the axis of the drum.

10. In a wheel suspension, a stationary supporting drum, a spring device comprising a plurality of interconnected metal disks and ring-like rubber blocks bonded between the faces of the disks, a wheel carrying arm rotatable relative to said drum and having a rotatable member projecting axially thereinto, a shock absorber housed at least in part within said spring device and connected to said member, said spring device being secured at one end to said drum and at its opposite end to said member and said rubber blocks being held under compression and effective to absorb loads by the deflection thereof in angular shear.

11. In a motor vehicle, a wheel, a shaft carrying said wheel and adapted to be rotated when the wheel moves vertically, a spider member attached to said shaft, a spring unit comprising a plurality of annular resilient members arranged around said shaft and connected together, means for securing one end of said unit to said spider, means for anchoring the other end of said unit to the vehicle structure, and a shock absorber including a housing and a shaft, said housing being connected with said spider member, and means for resiliently restraining rotation of said shock absorber shaft.

12. In a motor vehicle having a body structure and wheels, a tubular member extending transversely of the vehicle, two drums disposed along a common axis and secured to the extremities of said tubular member at their inner ends and to the body structure at their outer ends, said tubular member being disposed below the common axis of said drums, two shafts located one in each drum substantially coaxially therewith, each of said shafts being operatively connected to one of said wheels and adapted to rotate as the wheel moves vertically, a spring unit comprising a plurality of annular rubber members located in each of said drums, said rubber members being positively connected to each other and arranged substantially coaxially with respect to a shaft, means securing one end of each spring unit to the vehicle structure, and means connecting the opposite end of each unit to a shaft.

13. In a motor vehicle having a body structure and wheels, a tubular member extending transversely of the vehicle, two drums disposed along a common axis and secured to the extremities of said tubular member at their inner ends and to the body structure at their outer ends, said tubular member being disposed below the common axis of said drums, two shafts located one in each drum substantially coaxially therewith, each of said shafts being operatively connected to one of said wheels and adapted to rotate as the wheel moves vertically, a spring unit comprising a plurality of annular rubber members located in each of said drums, said rubber members being positively connected to each other and arranged substantially coaxially with respect to a shaft, means securing one end of each spring unit to the vehicle structure, means connecting the opposite end of each unit to a shaft, and a shock absorber drivingly connected to each shaft and anchored to the body structure of the vehicle.

PAUL KLOTSCH.